United States Patent
Wang et al.

(10) Patent No.: US 12,554,670 B2
(45) Date of Patent: Feb. 17, 2026

(54) CONTROLLING ELECTRICAL IDLE STATES IN RETIMER OUTPUTS

(71) Applicant: PARADE TECHNOLOGIES, LTD., San Jose, CA (US)

(72) Inventors: Hongquan Wang, Shanghai (CN); Liang Xu, Shanghai (CN); Feng Xu, Nanjing (CN); Yuanping Chen, Cupertino, CA (US); Mengchuan Gao, Shanghai (CN)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 115 days.

(21) Appl. No.: 18/477,470

(22) Filed: Sep. 28, 2023

(65) Prior Publication Data

US 2025/0110913 A1    Apr. 3, 2025

(51) Int. Cl.
*G06F 13/42*    (2006.01)
*G06F 1/3234*    (2019.01)

(52) U.S. Cl.
CPC ........ *G06F 13/4282* (2013.01); *G06F 1/3253* (2013.01); *G06F 2213/0026* (2013.01); *G06F 2213/0042* (2013.01)

(58) Field of Classification Search
CPC ............... G06F 13/4282; G06F 1/3253; G06F 2213/0026; G06F 2213/0042
See application file for complete search history.

(56) References Cited

U.S. PATENT DOCUMENTS

| | | | | |
|---|---|---|---|---|
| 10,146,722 | B1 * | 12/2018 | Brown | G06F 13/4221 |
| 11,424,905 | B1 * | 8/2022 | Musoll | G06F 13/4295 |
| 2005/0271169 | A1 * | 12/2005 | Momtaz | H04L 7/033 |
| | | | | 375/345 |
| 2005/0281193 | A1 * | 12/2005 | Hofmeister | H04L 1/205 |
| | | | | 370/217 |
| 2015/0085187 | A1 * | 3/2015 | Chen | H04N 7/0127 |
| | | | | 348/441 |
| 2015/0295679 | A1 * | 10/2015 | Valliappan | H04L 1/0075 |
| | | | | 370/252 |
| 2017/0017604 | A1 * | 1/2017 | Chen | G06F 11/3027 |
| 2017/0286359 | A1 * | 10/2017 | McGowan | G06F 13/4291 |
| 2017/0371831 | A1 * | 12/2017 | Das Sharma | G06F 13/4291 |
| 2019/0042510 | A1 * | 2/2019 | Ngau | G06F 13/4027 |
| 2019/0196991 | A1 * | 6/2019 | Das Sharma | G06F 13/4063 |

(Continued)

*Primary Examiner* — Idriss N Alrobaye
*Assistant Examiner* — Henry W Yu
(74) *Attorney, Agent, or Firm* — Morgan, Lewis & Bockius LLP

(57) ABSTRACT

This application is directed to controlling an electrical idle state of a retimer of a data communication channel. A receiving side of the retimer obtains an input signal including at least an exit command and a data sequence following the exit command. The exit command requests the retimer to exit a target energy saving state and transmit the data sequence. The retimer splits the input signal into two distinct signals including a control signal carrying the exit command and a data signal carrying the data signal. The retimer extends the exit command carried by the control signal, outputs the control signal carrying the extended exit command at an output of the retimer, and in accordance with a determination that the retimer has been equalized and locked, outputs the data signal carrying the data sequence at the output of the retimer.

20 Claims, 10 Drawing Sheets

(56) References Cited

U.S. PATENT DOCUMENTS

2019/0363869 A1* 11/2019 Li .................... H04L 7/0058
2021/0271537 A1*  9/2021 Gong .............. G06F 13/4295
2024/0039689 A1*  2/2024 Meltser ............ G06F 1/3253

\* cited by examiner

*900*

| 902 — Obtain, by a receiving side of the retimer, an input signal including at least an exit command and a data sequence following the exit command. |
| --- |
| 904 — The exit command requests the retimer to exit a target energy saving state and transmit the data sequence. |

↓

| 906 — Split the input signal into two distinct signals. |
| --- |
| 908 — The two distinct signals include a control signal carrying the exit command and a data signal carrying the data signal. |

↓

910 — Extend the exit command carried by the control signal.

↓

912 — Output the control signal carrying the extended exit command at an output of the retimer.

↓

914 — In accordance with a determination that the retimer has been equalized and locked, output the data signal carrying the data sequence at the output of the retimer.

Figure 9

CONTROLLING ELECTRICAL IDLE STATES IN RETIMER OUTPUTS

TECHNICAL FIELD

The disclosed embodiments relate generally to data transmission technology, including methods, systems, and devices for controlling electrical idle states of a data interface (e.g., including redrivers or retimers) in a high-speed data communication channel.

BACKGROUND

Many electronic devices are physically coupled to each other and communicate with each other using data links and interfaces in compliance with an industry bus standard, which specifies physical interfaces and protocols for connecting, data transferring and powering of hosts. This bus standard allows the application of retimers to extend the channel reach at a high data speed. A retimer is a mixed-signal device that is standard-aware and has an ability to fully recover the data, extract the embedded clock, and retransmit a fresh copy of the data using a clean clock. Compared with a conventional redriver, the retimer actively participates in applying the bus standard to implement negotiation, timeouts, bit manipulation, jitter resetting, signal equalization, skew correction, and many other functions. The redriver is an analog extension device designed to boost portions of a signal to counteract attenuation caused by signal propagation over a physical interconnect of a corresponding data link.

Redrivers and retimers normally remains in an electrical idle state when there is no data communicated via the redrivers or retimers. When an electronic device starts sending high speed data to the redrivers or retimers, the redrivers or retimers need a control signal to control its mainlink to exit the electrical idle state timely in compliance with the associated industry bus standard without corrupting the high speed data following the electrical idle state.

SUMMARY

This application is directed to methods, electronic systems, electronic devices, electronic circuits, data links, data ports, and data interfaces that control an electrical idle state in a retimer of a data interface of a data link in compliance with a predefined bus standard (e.g., Universal Serial Bus (USB) 3.0 or above). For example, a retimer-based repeater is generally used in USB Gen3 applications. The electrical idle state of the repeater follows a low power link state (also called an energy saving state) and is controlled to comply with USB 3.0 or above. A retimer includes a clock data recovery (CDR) loop for recovering a high speed data signal (e.g., having a data rate of 10 Gbps). The CDR loop is enabled when the high speed data signal is detected, while requiring some time to stabilize its operation. Conversely, low frequency periodic signaling (LFPS) is used for side band communication between the two ports across a data link, when the retimer is in the low power link state and the CDR loop is disabled. USB Gen3 specifications require that an electrical idle duration is required to be controlled under a predefined electrical idle duration (e.g., 20 ns), after the retimer exits from low power link states (U1/U2/U3) and before the retimer starts to output the high speed data signal (TS1) following LFPS. Excessive electrical idle that extends longer than the predefined electrical idle duration violates the specifications and induces instability in the CDR loop. In various embodiments of this application, an input signal (TS1) includes at least an exit command and a data sequence following the exit command. The exit command is intentionally extended until the CDR loop of the retimer is stabilized to process the data sequence properly. The excess electrical idle is filled with an extended portion of the exit command. As such, the electrical idle state observed at the output of the retimer is controlled in compliance with the specifications of the predefined bus standard, thereby avoiding data corruption at the output of the retimer and enhancing performance of the data link.

In one aspect of this application, a method is implemented at a retimer of an electronic device for controlling an electrical idle state of a retimer. The method includes obtaining, by a receiving side of the retimer, an input signal including at least an exit command and a data sequence following the exit command. The exit command requests the retimer to exit a target energy saving state and transmit the data sequence. The method includes splitting the input signal into two distinct signals, and the two distinct signals include a control signal carrying the exit command and a data signal carrying the data signal. The method further includes extending the exit command carried by the control signal, outputting the control signal carrying the extended exit command at an output of the retimer, and in accordance with a determination that the retimer has been equalized and locked, outputting the data signal carrying the data sequence at the output of the retimer.

In another aspect, a non-transitory computer-readable storage medium stores one or more programs to be executed by one or more processors. The one or more programs include instructions for implementing any of the above methods for controlling an electrical idle state of a retimer in a data interface of a data communication channel.

In another aspect, a retimer device of an electronic device includes an input interface for obtaining, by a receiving side of the retimer, an input signal including at least an exit command and a data sequence following the exit command. The exit command requests the retimer device to exit a target energy saving state to transmit the data sequence in a normal state. The retimer device further includes a LFPS module coupled to the input interface. The LFPS module is configured to extract, from the input signal, a control signal carrying the exit command and extending the exit command in the control signal. The retimer device further includes a retimer core coupled to the input interface, the retimer configured to re-generate a data signal carrying the data sequence from the input signal. The retimer device further includes a multiplexer coupled to the LFPS module and the retimer. The multiplexer is configured to select the control signal and output the control signal carrying the extended exit command at an output of the retimer. In accordance with a determination that the retimer has been equalized and locked, the multiplexer is configured to select the data signal and output the data signal carrying the data sequence at the output of the retimer.

In some embodiments, the retimer device further includes a high speed detector coupled to the retimer core and configured to detect a start of the data sequence in the input signal.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 is a flow diagram of an example method for controlling an electrical idle state of a retimer of a data link, in accordance with some embodiments.

Like reference numerals refer to corresponding parts throughout the several views of the drawings.

DESCRIPTION OF EMBODIMENTS

Figure 1:
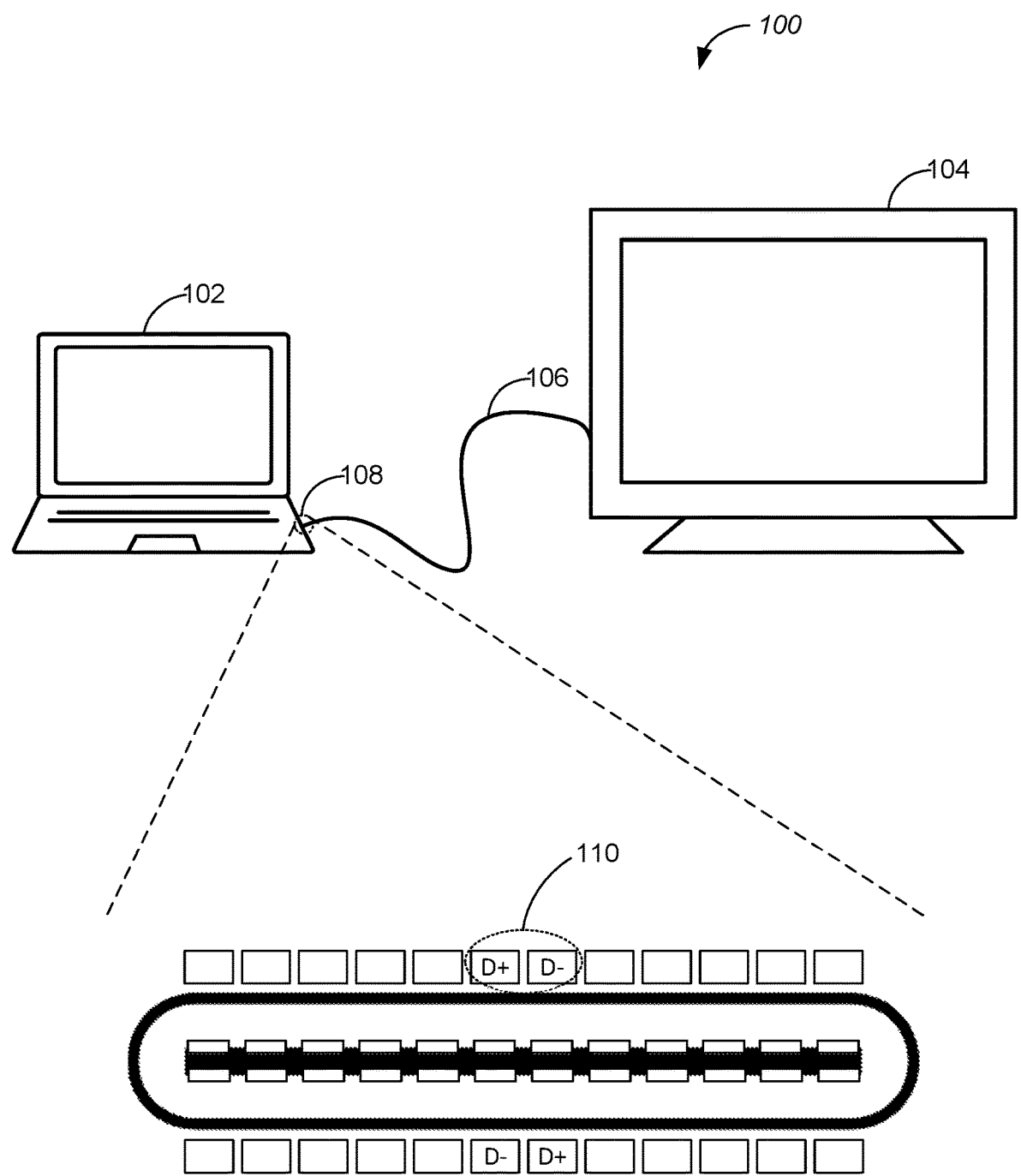
FIG. 1 is a block diagram of an example electronic system in which electronic devices are electrically connected via a data link, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of this application are directed to methods, electronic systems, electronic devices, electronic circuits, data links, data ports, and data interfaces that control an electrical idle state in a retimer of a data interface of a data link in compliance with a predefined bus standard (e.g., USB 3.0 or above). For example, a retimer-based repeater is generally used in USB Gen3 applications. The electrical idle state of the repeater follows a low power link state (also called an energy saving state) and is controlled to comply with USB 3.0 or above. A retimer includes a CDR loop for recovering a high speed data signal (e.g., having a data rate of 10 Gbps). The CDR loop is enabled when the high speed data signal is detected. Conversely, LFPS is used for side band communication between the two ports across a data link, e.g., when the retimer is in the low power link state and the CDR loop is disabled, when the data link is under training, or when a downstream port issues a warm reset to reset the data link.

As the low power link state is terminated and the CDR loop is initiated, the CDR loop requires microseconds to lock data for loop stabilization, and the high speed data signal can be easily truncated by the retimer, resulting in additional electrical idle at an output of the retimer. The USB 3.0 specifications require that a duration of electrical idle be controlled under a predefined electrical idle duration (e.g., 20 ns), after the retimer exits from low power link states (U1/U2/U3) and before the retimer starts to output the high speed data signal (TS1) following LFPS. Excessive electrical idle that extends longer than the predefined electrical idle duration violates the specifications and induces instability in the CDR loop, thereby compromising performance of the data link. In some embodiments, a built-in protocol analyzer is applied to detect entering of the low power link states (U1/U2/U3), and involves descrambling and symbol recovery, whose circuit is bulky and power consuming. Conversely, in some embodiments, an input signal includes at least an exit command indicating a termination of a low power link state and a data sequence following the exit command. The exit command is intentionally extended, until the CDR loop of the retimer is stabilized to output the data sequence following the exit command. The excess electrical idle is filled with an extended portion of the exit command. As such, the electrical idle state observed at the output of the retimer is controlled in compliance with the specifications, thereby avoiding data corruption at the output of the retimer and enhancing performance of the data link.

FIG. 1 is a block diagram of an example electronic system 100 in which a first electronic device 102 is electrically coupled to a second electronic device 104 via a data link 106, in accordance with some embodiments. The first electronic device 102 and second electronic device 104 are configured to exchange data via the data link 106. In some embodiments, the first electronic device 102 includes a video source, and the second electronic device 104 includes a display device. The display device has a screen configured to display visual content provided by the first electronic device 102 via the data link 106. In another example not shown, the first electronic device 102 is a desktop computer and the second electronic device 104 is a mobile phone that exchanges data with the desktop computer via the data link 106. Examples of the electronic devices 102 and 104 include, but are not limited to, a desktop computer, a laptop computer, a tablet computer, a video player, a camera device, a gameplayer device, and other formats of electronic devices that are configured to provide data or receive data. Video data, audio data, text, program data, control data, configuration data, or any other data is transmitted between the first and second electronic devices 102 and 104 via the data link 106.

Connectors 108 include connectors incorporated into electronic devices as well as connectors at the ends of cables, such as the data link cable 106. The data link cable 106 includes a connector 108 at each end. The two data link connectors 108 are configured to connect the data link 106 to respective connectors 108 of the first electronic device 102 and second electronic device 104. In some embodiments, the connectors 108 are DisplayPort connectors having a digital display interface developed by a consortium of personal computer and chip manufacturers and standardized by the Video Electronics Standards Association (VESA). The DisplayPort connectors are configured to connect the data link 106 to the first electronic device 102 and carry video, audio, and control data according to a data communication protocol. In another example, the connectors 108 are universal serial bus (USB) connectors (e.g., configured to connect a computer to a peripheral device). Exemplary types of USB connectors include, but are not limited to, USB-A, USB-B, USB-C, USB Micro-A, USB Micro-B, USB Mini-B, USB 3.0A, USB 3.0B, USB 3.0 Micro B, and USB Micro-AB. Further, a data communication protocol of USB4 is applied to communicate data using a USB-C connector, thereby providing a throughput of up to 40 Gbps, power delivery of up to 100 W, support for 4K and 5K displays, and backward compatibility with USB 3.2 and USB 2.

In some embodiments, the connectors 108 include a bidirectional channel for communicating a stream of data between the first and second electronic devices 102 and 104. The bidirectional channel of the connectors 108 include two data lanes and a pair of differential pins 110 coupled to the two data lanes. The pair of differential pins 110 is configured to receive a differential input signal from the first electronic device 102 or the second electronic device 104, and the differential input signal carries a serial data command or serial content data (e.g., video or audio data) that is communicated via the two data lanes of the connectors 108. As such, the two data lanes and pair of differential pins 110 of the connectors 108 are configured to facilitate bidirectional communication between the first electronic device 102 and the second electronic device 104. The bidirectional channel is a data channel or an auxiliary channel. Specifically, the auxiliary channel of the connectors 108 is used for communication of additional serial data beyond video and audio data, such as consumer electronics control (CEC) commands. In some embodiments, the pair of differential pins 110 is coupled to a dedicated set of twisted-pair wires configured to carry two input signals of the differential input signal.

Each connector 108 of the data link 106 is configured to be coupled to a respective connector 108 of the first electronic device 102 or a respective connector 108 of the second electronic device 104. Each connector 108 of the data link 106 is bidirectional, and so is each connector 108 of the electronic devices 102 and 104. When a connector 108 of the data link 106 is coupled to the first or second electronic device 102 or 104, the pair of differential pins 110 of the connector 108 of the data link 106 is physically and electrically coupled to a pair of differential pins 110 of the connector 108 of the first or second electronic device 102 or 104. The pair of differential pins 110 of the connector 108 of the first or second electronic device 102 or 104 is configured to receive data from, or transmit data to, the differential pins 110 of the connector 108 of the data link 106.

Figure 2:
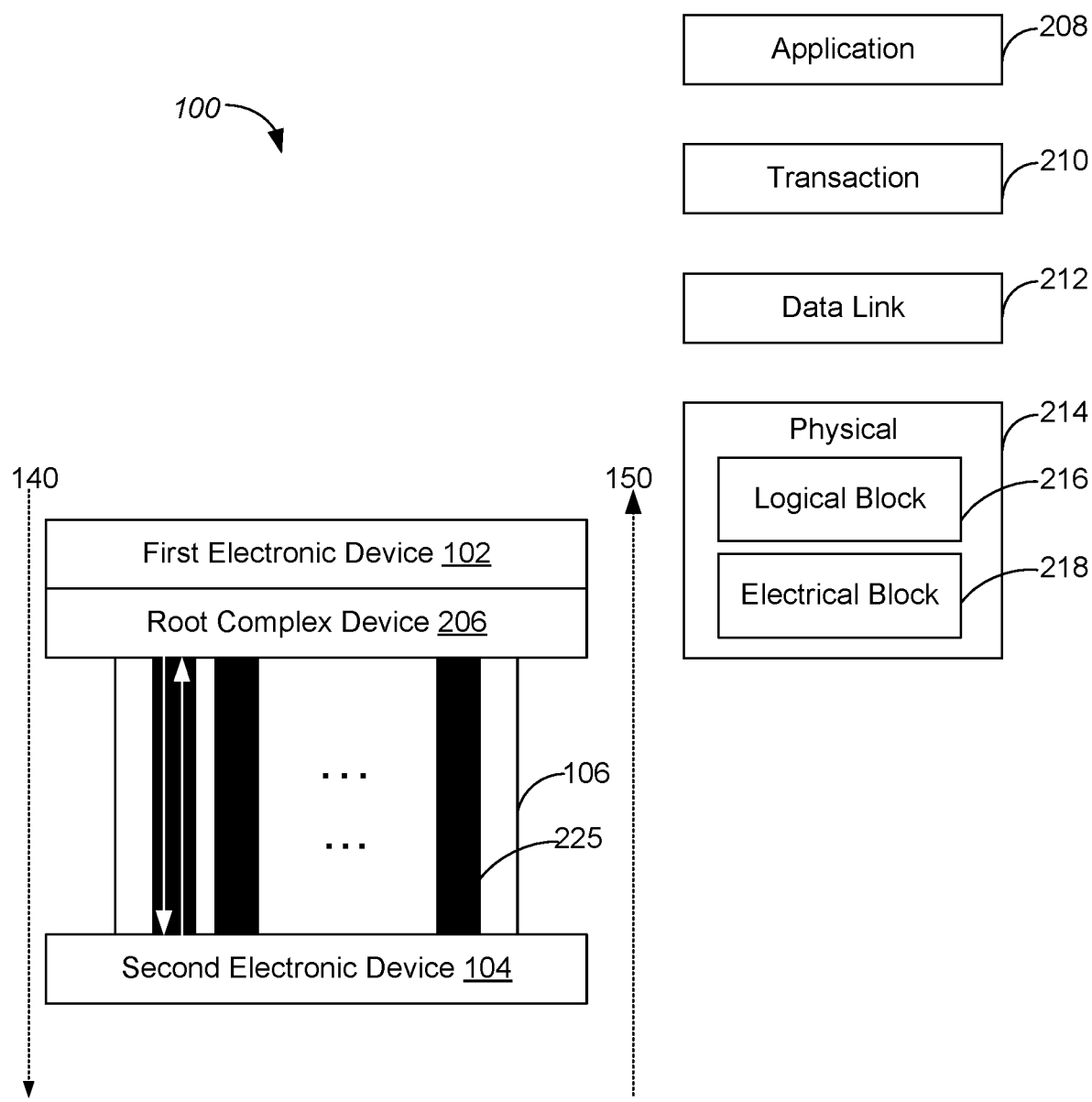
FIG. 2 is an example PCI Express electronic system in which a first electronic device or component is electrically coupled to a second electronic device or component via a data link, in accordance with some embodiments.

FIG. 2 is an example PCI Express electronic system 100 in which a first electronic device or component 102 is electrically coupled to a second electronic device or component 104 via a data link 106, in accordance with some embodiments. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving from the second electronic device 104. The connection port is optionally formed on the mother board of the personal computer. The data link 106 complies with PCI Express (i.e., PCIe), which is a high-speed serial computer expansion bus standard, and provides an interface to communicate data packets between the first and second electronic devices 102 and 104 in compliance with the PCI Express. The data link 106 is a serial data bus including one or more data transmission channels 225. Each channel 225 includes two wire sets for transmitting and receiving data packets, thereby supporting full-duplex communication between the first and second electronic devices 102 and 104. In some examples, the data link 106 has 1, 4, 9, or 16 channels 225 coupled in a single data port of the data link 106. For each lane, the two wire sets correspond to a downstream data direction 140 or an upstream data direction 150 (defined with respect to the first electronic device 102). In some embodiments, each wire set includes two wires for carrying a pair of differential signals.

In some embodiments, the first electronic device 102 includes or is coupled to a root complex device 206 that is further coupled to the data link 106. The root complex device 206 is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some embodiments, the first electronic device 102 is coupled to one or more additional electronic devices besides the second electronic device 104. The data link 106 includes one or more switch devices to couple the root complex device 206 of the first electronic device 102 to multiple endpoints including the second electronic device 104 and additional electronic devices not shown in FIG. 1.

PCI Express is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 of PCI Express controls link training and electrical (analog) signaling, and includes a logical block 216 and an electrical block 218. The logical block 216 defines ordered data sets in training states, and the electrical block 218 defines eye diagram characteristics and analog waveforms. Each layer of the layered model includes first specifications for a transmitting end where a root complex device 206 is coupled and second specifications for a receiving end where a peripheral component (i.e., the second electronic device 104) is coupled.

As high frequency signals are transmitted within the channels 225 of the data link 106, these signals are distorted and spread over sequential symbols and result in inter symbol interferences (ISI) and bit errors at the receiving end of the second electronic device 104. These ISI and bit errors can be suppressed by a feed-forward equalizer (FFE) that is coupled serially on a path of the data link 106 and configured with equalization settings using an equalization procedure. In an example, the FFE includes a finite impulse response (FIR) filter. The equalization procedure is implemented when a high-speed data transfer rate needs to be initialized, when an equalization request is issued from the application layer 208, or when a BER (bit error rate) exceeds a data error tolerance. In some embodiments, initiation and termination of the equalization procedure are detected on the physical layer 214 based on data packets transferred over the data link 106.

Figure 3A:
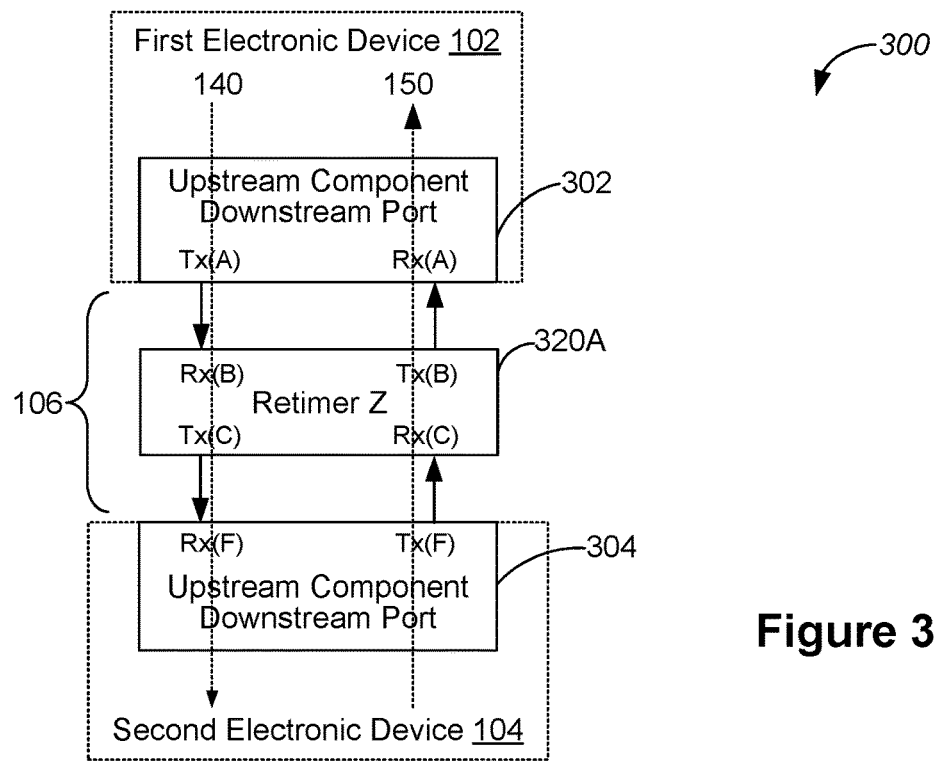
FIGS. 3A and 3B are two example electronic systems in which a data link is coupled between two electronic devices or components and includes at least one retimer, in accordance with some embodiments.
Figure 3B:
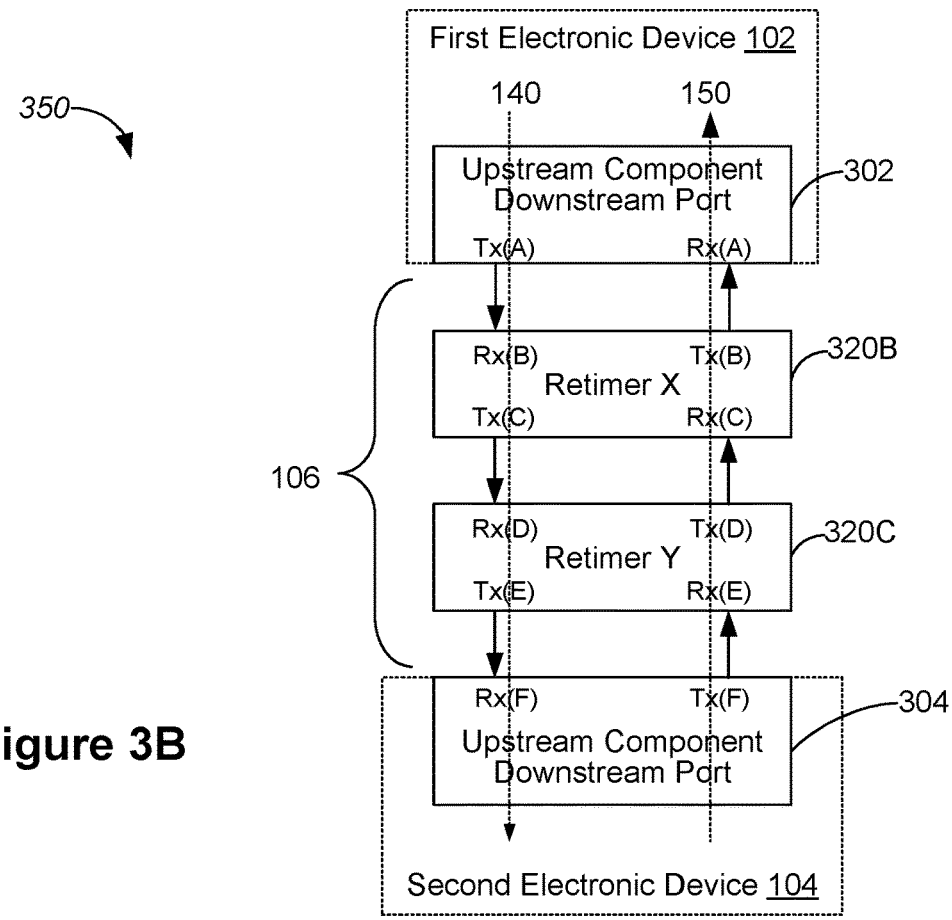

FIGS. 3A and 3B are two example electronic systems 300 and 350 in which a data link 106 is coupled between two electronic devices or components 102 and 104 and includes at least one retimer 320 (e.g., the retimers 320A, 320B, and 320C), in accordance with some embodiments. A retimer 320 is a mixed-signal device that is configured to transmit data packets actively (i.e., extract an embedded clock and recover the data packets in compliance with a bus standard, such as PCI Express). In an example, the retimer has a continuous time linear equalizer (CTLE), a wideband gain stage, and one or more of a clock and data recovery (CDR) circuit, a decision feedback equalizer (DFE), and a finite impulse response (FIR) driver. A state machine and/or a microcontroller is used in the retimer 320 to manage the CTLE, the wideband gain stage, the DFE, and the FIR driver, and implement a link training and status state machine (LTSSM).

The data link 106 enables bidirectional data communication between the electronic devices 102 and 104. A first electronic device 102 includes an upstream component 302 having a transmitting interface Tx(A) and a receiving interface Rx(A), and a second electronic device 104 includes a downstream component 304 having a receiving interface Rx(F) and a transmitting interface Tx(F). Each retimer 320 of the data link 106 is coupled between the electronic devices 102 and 104, and has a receiving interface Rx and a transmitting interface Tx for each of the downstream data direction 140 and the upstream data direction 150. Referring to FIG. 3A, the data link 106 includes only one retimer 320A. In some embodiments, the retimer 320A is disposed in proximity to the upstream component 302 of the first electronic device 102 or the downstream component 304 of the second electronic device 104. The receiving interface Rx(B) and the transmitting interface Tx(B) of the retimer 320A are coupled to the transmitting interface Tx(A) and receiving interface Rx(A) of the first electronic device 102, respectively. Another transmitting interface Tx(C) and another receiving interface Rx(C) of the retimer 320A are coupled to the receiving interface Rx(F) transmitting interface Tx(F) of the second electronic device 104, respectively. As such, data packets are transmitted between the electronic devices 102 and 104, either sequentially through the interfaces Tx(A), Rx(B), Tx(C), and Rx(F) on the downstream data direction 140 or sequentially through the interfaces Tx(F), Rx(C), Tx(B), and Rx(A) on the upstream data direction 150.

Referring to FIG. 3B, the data link 106 includes two retimers 320B and 320C that are electrically coupled in series between the first and second electronic devices 102 and 104. In an example, the first retimer 320B is disposed in proximity to the upstream component 302 of the first electronic device 102, and the second retimer 320C is disposed in proximity to the downstream component 304 of the second electronic device 104. A receiving interface Rx(B) and a transmitting interface Tx(B) of the first retimer 320B are coupled to the transmitting interface Tx(A) and receiving interface Rx(A) of the first electronic device 102, respectively. Another transmitting interface Tx(C) and another receiving interface Rx(C) of the first retimer 320B are coupled to a receiving interface Rx(D) and a transmitting interface Tx(D) of the second retimer 320C, respectively. Another transmitting interface Tx(E) and another receiving interface Rx(E) of the second retimer 320C are coupled to the receiving interface Rx(F) and transmitting interface Tx(F) of the second electronic device 104, respectively. As such, data packets are transmitted between the electronic devices 102 and 104, either sequentially through the interfaces Tx(A), Rx(B), Tx(C), Rx(D), Tx(E), and Rx(F) on the downstream data direction 140 or sequentially through the interfaces Tx(F), Rx(E), Tx(D), Rx(C), Tx(B), and Rx(A) on the upstream data direction 150.

Figure 4A:
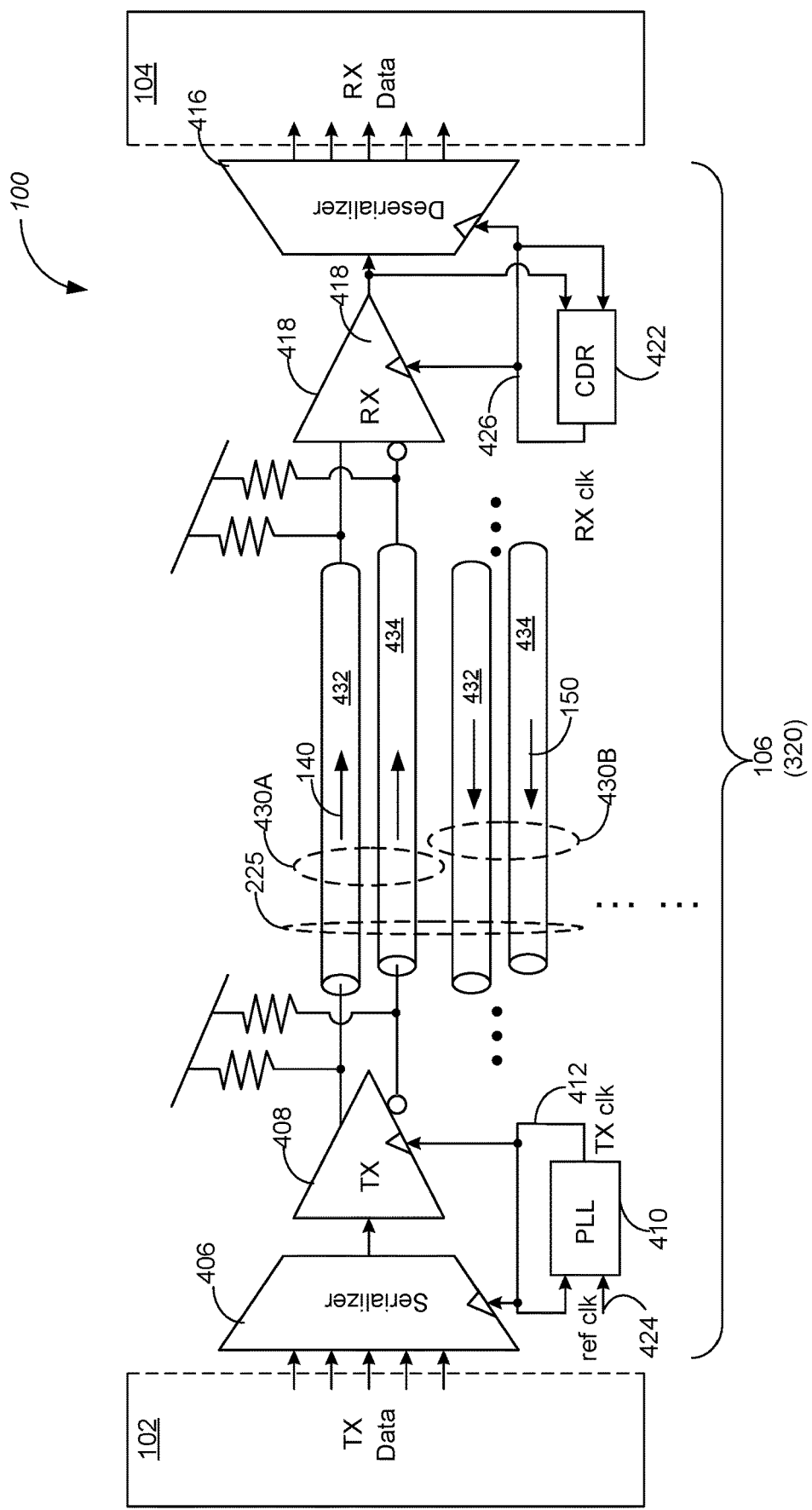
FIG. 4A is a block diagram an example electronic system in which a first electronic device or component is electrically coupled to a second electronic device or component via a data link, in accordance with some embodiments.
Figure 4B:
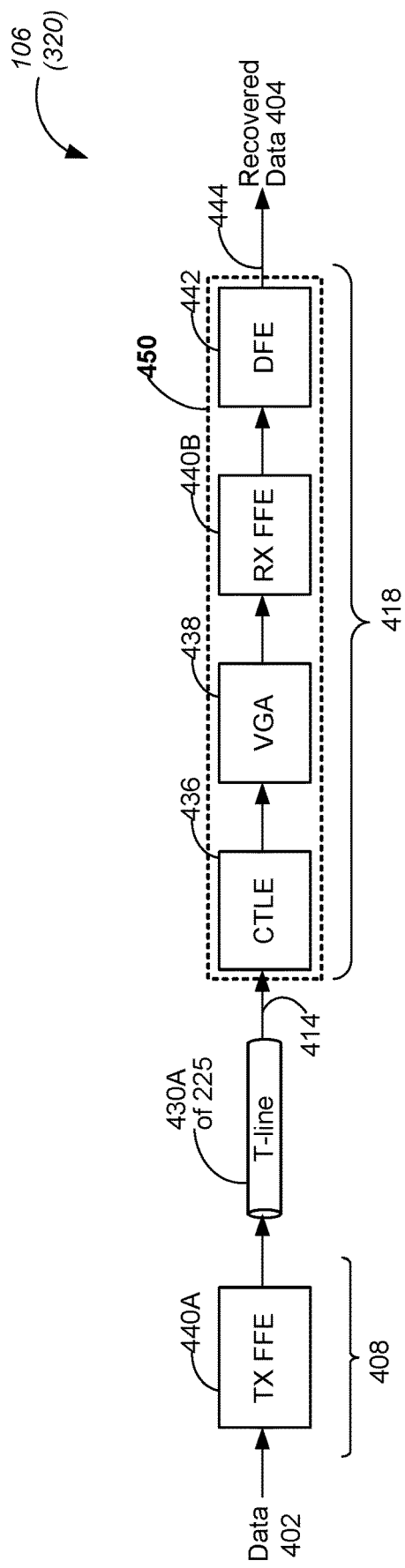
FIG. 4B is a block diagram of an example data link including a plurality of modulation circuits, in accordance with some embodiments.

FIG. 4A is a block diagram of an example electronic system 100 in which a first electronic device or component 102 is electrically coupled to a second electronic device or component 104 via a data link 106, in accordance with some embodiments, and FIG. 4B is a block diagram of an example data link 106 including a plurality of modulation circuits 450, in accordance with some embodiments. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving data from the second electronic device 104. The connection port is optionally formed on the mother board of the personal computer. In some embodiments, the data link 106 complies with a high-speed serial computer expansion bus standard (e.g., PCI Express (PCIe) or USB 4) and provides an interface to communicate data packets between the first and second electronic devices 102 and 104 in compliance with the bus standard. The data link 106 is a serial data bus including one or more data channels 225. In some embodiments, each data channel 225 includes two wire sets 430A and 430B (also called two data lanes) for transmitting and receiving data packets, respectively, thereby supporting full-duplex communication between the first and second electronic devices 102 and 104. In some examples, the data link 106 has 1, 4, 9, or 16 channels coupled in a single data port of the data link 106. For each data channel 225, the two wire sets 430A and 430B correspond to a downstream data direction 140 and an upstream data direction 150 defined with respect to the first electronic device 102, respectively. In some embodiments, each wire set 430A or 430B includes two respective wires 432 and 434 for carrying a pair of differential signals.

In some embodiments, the first electronic device 102 includes or is coupled to a root complex device (not shown) that is further coupled to the data link 106. The root complex device is configured to generate requests for transactions including a series of one or more packet transmissions on behalf of the first electronic device 102. Examples of the transactions include, but are not limited to, Memory Read, Memory Read Lock, Input Output (IO) Read, IO Write, Configuration Read, Configuration Write, and Message. In some embodiments, the first electronic device 102 is coupled to one or more additional electronic devices besides the second electronic device 104. The data link 106 includes one or more switch devices to couple the root complex device of the first electronic device 102 to multiple endpoints including the second electronic device 104 and additional electronic devices not shown in FIGS. 1 and 2.

A data transmission protocol (e.g., PCI Express, USB4 v2.0, or DisplayPort 2.1) is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 controls link training and electrical (analog) signaling, and includes a logical block and an electrical block. The logical block 216 defines ordered data sets in training states, and the electrical block 218 defines eye diagram characteristics and analog waveforms. Each layer of the layered model includes first specifications for the transmitting side where a root complex device is coupled and second specifications for the receiving side where a peripheral component (i.e., the second electronic device 104) is coupled.

As signals are transmitted within the wire sets 430A and 430B of each data channel 225 of the data link 106, the signals are distorted and spread over sequential symbols. This results in inter symbol interferences (ISI) and bit errors at the receiving side of the second electronic device 104. In some embodiments, these ISI and bit errors can be suppressed by a feed-forward equalizer (FFE) that is coupled serially on a path of the data link 106 and configured with equalization settings using an equalization procedure. For example, an equalization procedure is implemented when a high-speed data transfer rate needs to be initialized, when an equalization request is issued from the application layer, or when the bit error rate (BER) exceeds the data error tolerance.

The electronic system 100 includes a serializer and deserializer (SERDES) system corresponding to the data link 106. The SERDES system of the data link 106 includes a serializer 406, a transmitter 408, the data channel 225, a receiver 418, and a deserializer 416. The serializer 406 converts parallel data received from the first electronic device 102 into serial data. The transmitter 408 sends the serial data to the data channel 225. The receiver 418 processes the serial data and sends the processed serial data to the deserializer 416, which converts the serial data back to the parallel data for the second electronic device 104. On the transmitting side, a phase lock loop 410 generates a transmitter clock signal 412 based on a reference clock signal 424, and the transmitter clock signal 412 is applied to control serialization of the data to be transmitted by the data channel 225 of the data link 106.

On the receiving side, a clock data recovery (CDR) circuit 422 is used to recover the receiver clock signal 426 from the serial data received via the data channel 225 and compensate for variation of signal amplitudes caused by loss and other factors in this data channel 225. In some embodiments, the CDR circuit 422 further includes a sampler and a clock recovery circuit. In some embodiments, the CDR circuit 422 is implemented based on one of: a phase-locked loop (PLL), a delay-locked loop (DLL), or a phase interpolator (PI). In some embodiments, the CDR circuit 422 satisfies a BER requirement corresponding to jitter tolerance. Additionally, the CDR circuit 422 complies with a communication interface standard (e.g., PCIe or USB4), is functional with spread spectrum clocking (SSC), and satisfies an electromagnetic interference (EMI) requirement. Under some circumstances, the CDR circuit 422 is configured to be applied in two or more data interfaces having different data rates and signal modulation schemes. The CDR circuit 422 is configurable (e.g., by offering a pull-in frequency range that is greater than a pull-in frequency range threshold and a jitter tolerance that is better than a jitter tolerance threshold). In some embodiments, the CDR circuit 422 is optimized in both of the pull-in frequency range and jitter tolerance.

The receiver clock signal 426 generated by the CDR 422 is used with the receiver 418 and the deserializer 416 to condition the serial data received via the data channel 225 and regenerate the parallel data from the serial data. During this process, the receiver 418 is configured to reduce (1) signal distortion, (2) data spreading over sequential symbols, (3) inter symbol interference (ISI), and (4) resulting bit errors of the serial data on the receiving side of the second electronic device 104. The receiver 418 is configured to generate an output data signal including the stream of data bits 402 in an input data signal of the receiver 418. In some embodiments, the receiver 418 includes a signal conditioning front end applying one or more modulation circuits 450 to compensate for loss from the data channel 225.

Referring to FIG. 4B, in some embodiments, the receiver 418 includes one or more of: a continuous time linear equalizer (CTLE) 436, a variable gain amplifier (VGA) 438, a feed-forward equalizer (FFE) 440B, and a decision feedback equalizer (DFE) 442. The CTLE 436 is configured to selectively attenuate low frequency signal components, amplify signal components around the Nyquist frequency, and remove higher frequency signal components to generate filtered serial data. Stated another way, in some embodiments, the CTLE 436 includes an analog filter designed to equalize the signal loss in certain frequencies. The VGA 438 has a variable gain. The DFE 442 is configured to further amplify the filtered serial data, and recover one or more data bits at each clock switching edge or during each clock cycle. The one or more recovered data bits form data packets. In some embodiments, the FFE 440B includes an FIR filter having a plurality of equalization settings (e.g., FIR coefficients), and is applied to improve signal quality of the data packets via digital signal conditioning (e.g., via high frequency filtering in a digital domain). In some embodiments, feed forward equalization is performed by a transmitter-side FFE 440A, a receiver-side FFE 440B, or both. The transmitter-side FFE 440A is configured to pre-distort the signal to compensate for the lossy data channel 225. In some embodiments, a subset or all of the modulation circuits 450 are applied, and the order of the modulation circuits 450 is optionally identical to or distinct from that shown in FIG. 4B. As such, the receiver 418 receives an input data signal 414 carrying a stream of data bits 402 according to a reference clock frequency (e.g., the reference clock signal 424 in FIG. 4A), and outputs an output data signal 404 including a stream of recovered data bits 404 that is consistent with the stream of data bits 402, thereby reliably keeping the stream of data bits 402 in the input data signal 414.

In some embodiments of this application, in-situ adaptation is implemented on different modulation circuits 450 of an electronic device (e.g., at a second electronic device 104 in FIG. 1). The electronic device includes a sequence of modulation circuits 450, and each modulation circuit has one or more adjustable configurations. The electronic device obtains an input data signal 414. The sequence of modulation circuits 450 processes the input data signal 414 and generates an equalized data signal 444 including a first data sample. The electronic device determines the first residual error of the first data sample, and adjusts the first adjustable configuration of the first modulation circuit (e.g., the CTLE 436) based on the first residual error. A second adjustable configuration of a second modulation circuit (e.g., the VGA 438) is further adjusted based on the first adjustable configuration. In some embodiments, a single receiver integrated circuit (IC) includes the sequence of modulation circuits 450 and is configured to operate with different data rates, ambient temperatures, protocols, cables, and operating environments. Each modulation circuit 450 of the receiver 418 is highly programmable and adaptive to offer different equalizer strengths and configurations in support of highly variable operating conditions. In-situ and real-time adaptations of the modulation circuits 450 are implemented dynamically, jointly, and iteratively without interfering with each other. As the operating conditions (e.g., ambient temperature) change in real time during operation, in-situ and real-time adaptation of the receiver 418 makes the data communication link 106 transmit data reliably and adjustably in response to variations of the operating conditions.

Figure 5:
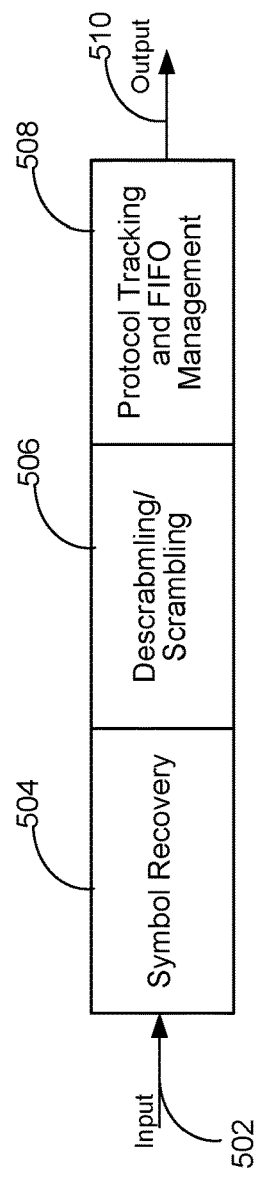
FIG. 5 is a flow diagram of a process for processing an input signal of a retimer in a data link, in accordance with some embodiments.

FIG. 5 is a flow diagram of a process 500 for processing an input signal 502 of a retimer 320 in a data link 106, in accordance with some embodiments. The data link 106 has an active state (U0) in which the retimer 320 restores and reshapes digital signals (e.g., the input signal 502) that carry a sequence of data packets and have degraded over the data link 106. The retimer 320 is configured to manipulate one or more data bits in the sequence of data packets carried by the input signal 502, thereby facilitating both protocol-aware equalization negotiation during an equalization procedure and data transmission in the active state (U0). In some embodiments not shown, the retimer 320 includes one or more of: a serial-to-parallel converter (i.e., deserializer), descrambler, decoder, data manipulator, encoder, scrambler, deskewer, and parallel-to-serial converter (i.e., serializer).

A CDR circuit 422 (FIG. 4A) is used to recover a receiver clock signal 426 from the sequence of data packets carried by the input signal 502. The deserializer receives the sequence of data packets from the CDR circuit 422 and converts (504) the sequence of data packets into first multi-bit parallel data signals. The descrambler de-scrambles (506) the multi-bit parallel data signals to generate descrambled data signals. The decoder receives the descrambled data signals and decodes the descrambled data signals. The decoded signals are then manipulated (508) in the data manipulator in compliance with an electronic device bus standard, e.g., USB 3.0 or above. When data manipulation is completed, the manipulated signals are encoded by the encoder, scrambled by the scrambler, and/or deskewed by the deskewer to provide second multi-bit parallel data signals, which are serialized by the serializer, processed by the FIR driver, and provided to a downstream device via a transmitting interface of the retimer 320. Stated another way, in some embodiments, the second multi-bit parallel data signal is converted to an output signal 510 including an equalized serial data signal, and the output signal 510 is outputted by the retimer 320 and provided to the downstream device. Data manipulation (508) complies with a predefined bus standard of the data link 106 and a first-in-first-out data management scheme.

In addition to the active state (U0), the data link 106 has a hierarchy of energy saving states (also called standby states or low power link states). In a USB 3.0 data link, the hierarchy of energy saving states includes a first energy saving state (U1), a second energy saving state (U2), and a third energy saving state (U3). The hierarchy of energy saving states is configured to optimize power consumption for the data link 106 and to improve power efficiency when data transmission is not actively occurring over the data link 106. Each of these states represents different levels of power-saving measures that a USB device or host controller (e.g., the electronic device 102 or 104) can employ. In the first energy saving state (U1), the USB device or host controller reduces power consumption while maintaining a low-latency connection. It is a shallow sleep state designed for situations when the device is not actively transmitting or receiving data but needs to be quickly responsive when data transfer is required. The first energy saving state (U1) provides power savings while ensuring that the device can quickly return to the active state (U0). For example, circuit having a large capacitive load remains active in the first energy saving state (U1) to ensure quick activation of the retimer 320. The second energy saving state (U2) is a deeper sleep state compared to first energy saving state (U1). In the second energy saving state (U2), the USB device or host controller has higher power savings than the first energy saving state (U1). The device's response time in the second energy saving state (U2) is slightly longer than in the first energy saving state (U1), and it requires more time to wake up and establish a connection when data transmission is needed. In some embodiments, in accordance with a determination that the first energy saving state (U1) lasts for more than a predefined low power duration of time, the retimer 320 activates the second energy saving state (U2) automatically. The third energy saving state (U3) represents the deepest sleep state among the hierarchy of energy saving states. In the third energy saving state (U3), the USB device or host controller goes into an even lower power mode, offering the highest power savings. Compared with the first and second energy saving states, the third energy saving state (U3) has a longer wake-up time when transitioning back to the active state (U0), i.e., takes more time to resume operation when data transfer is required. For example, circuit having a large capacitive load is disabled and turned off in the third energy saving state (U3) to reduce energy consumption. In some embodiments, in accordance with a determination that the second energy saving state (U2) lasts for more than a predefined low power duration of time, the retimer 320 activates the third energy saving state (U3) automatically.

In some embodiments, the retimer 320 is configured to enter and exit an energy saving state in the hierarchy of energy saving states using a protocol analyzer configured to detect entering of an energy saving state (e.g., U1, U2, or U3). The protocol analyzer descrambles, and recovers symbols from, the input signal 502, and could be bulky in size and inefficient in power consumption. Alternatively, in some embodiments, the retimer 320 does not include any protocol analyzer that implements descrambling or symbol recovery operations. The retimer 320 is configured to detect an exit command (which optionally follows a signature ping signal sequence) of the energy saving states, and extends a length of the exit command until the retimer 320 is completely equalized and stabilized for processing the input signal 502.

Figure 6:
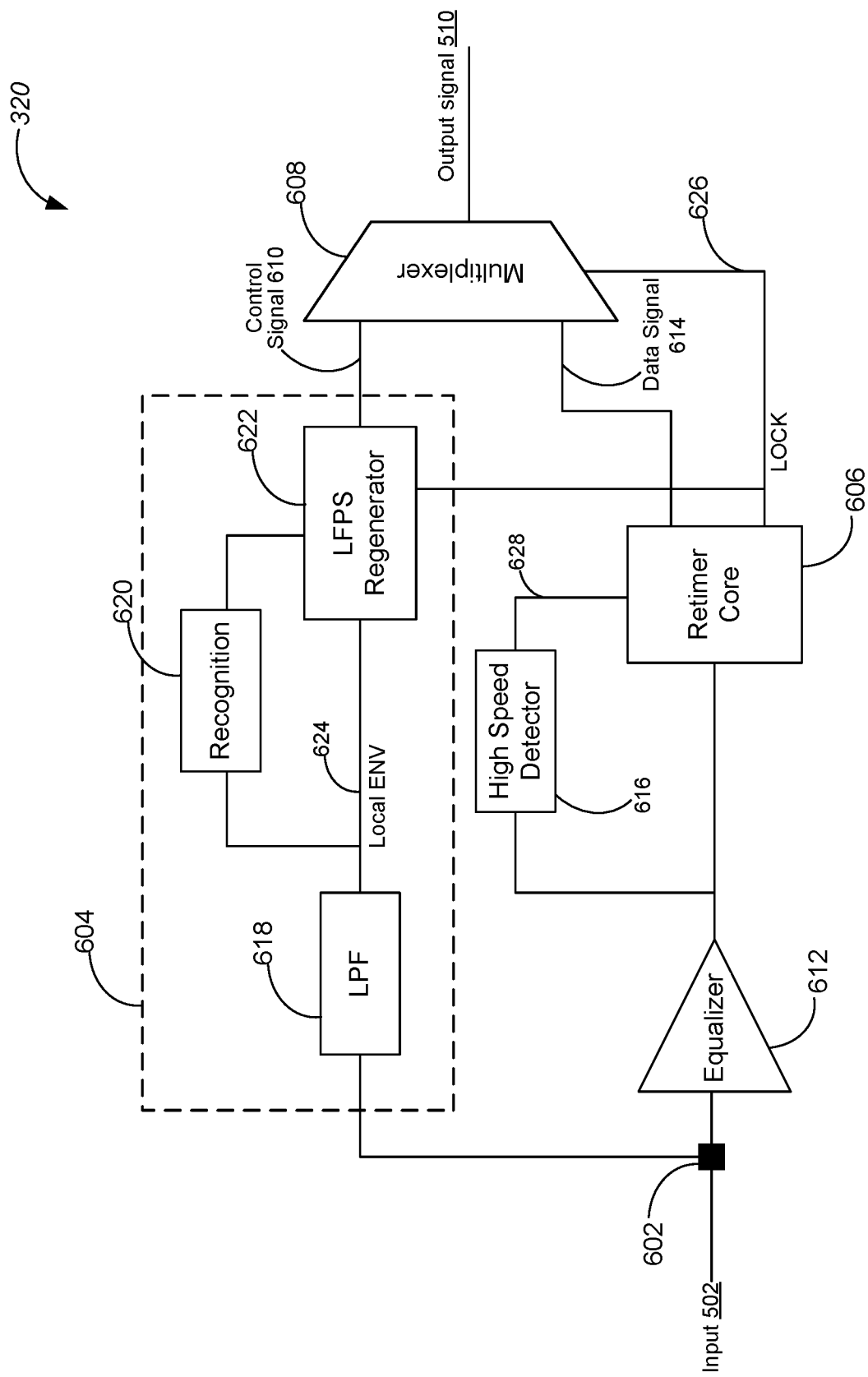
FIG. 6 is a block diagram of an example retimer in a data link 106, in accordance with some embodiments.

FIG. 6 is a block diagram of an example retimer 320 in a data link 106, in accordance with some embodiments. The retimer 320 is configured to control a length of an electrical idle state between an energy saving state and an active state in compliance with specifications of a high-speed serial computer expansion bus standard (e.g., USB 3.0 or above). In an example, the length of the electrical idle state between the energy saving state and the active state is less than 20 ns at an output of the retimer 320. In some embodiments, a receiver side of the retimer 320 obtains an input signal 502 including at least an exit command and a data sequence following the exit command. The retimer 320 extends the exit command and outputs the extended exit command at the output of the retimer 320, until the retimer 320 is equalized and locked to output the data sequence properly.

The retimer 320 includes an input interface 602, an LFPS module 604, a retimer core 606, and a driver (e.g., a multiplexer 608). The input interface 602 is included in a receiving side of the retimer 320, and configured to obtain an input signal 502 including at least an exit command (e.g., 704 in FIG. 7A, 754 in FIG. 7B) and a data sequence (e.g., 706 in FIGS. 7A and 7B) following the exit command. The exit command requests the retimer 320 to exit a target energy saving state (e.g., U1, U2, or U3) to transmit the data sequence in an active state (e.g., U0). The LFPS module 604 is coupled to the input interface 602, and configured to extract, from the input signal 602, a control signal 610 carrying the exit command and extend the exit command in the control signal 610. The retimer core 606 is coupled to the input interface 602 (e.g., via an equalizer 612), and configured to generate a data signal 614 carrying the data sequence based on the input signal 602. Stated another way, the retimer core 606 is applied for data clock recovery, further improving signal integrity. The driver (e.g., the multiplexer 608) is coupled to the LFPS module 604 and the retimer core 606, and configured to select the control signal 610 or data signal 614 to be outputted based on a lock signal 626, which indicates whether the retimer device 320 (e.g., the equalizer 612 and the retimer core 606) has been equalized and locked.

In some embodiments, the retimer core 606 generates the lock signal 626. In accordance with the retimer device 320 (e.g., the equalizer 612 or the retimer core 606) has not been equalized and locked (i.e., the lock signal 626 is not enabled), the multiplexer 608 selects the control signal 610 and outputs the control signal 610 carrying the extended exit command at an output of the retimer 320. Conversely, in accordance with a determination that the retimer device 320 (e.g., the equalizer 612 and the retimer core 606) has been equalized and locked (i.e., the lock signal 626 is enabled), the multiplexer 608 is configured to select the data signal 614 and output the data signal 614 carrying the data sequence at the output of the retimer device 320. As such, the retimer 320 is equalized to compensate for distortion of the input signal 502 and re-generates the data signal 614 including the data sequence.

In some embodiments, the retimer 320 further includes a high speed detector 616 coupled to the retimer core 606. The high speed detector 616 is configured to generate a high speed data signal 628 based on whether the data sequence is detected in the input signal 502, e.g., including detecting a start of the data sequence in the input signal 502 and enabling the high speed data signal 628 in response to detection of the start of the data sequence. The retimer core 606 is configured to re-generate the data signal 614 carrying the data sequence in response to detection of the start of the data sequence.

In some embodiments, the equalizer 612 includes one or more of: a CTLE 436, a VGA 438, an FFE 440B, and a DFE 442, and is used to compensate for distortion of the input signal 502 caused by channel attenuation, crosstalk, reflection and other non-ideal factors. More details on these modulation circuits are discussed above with reference to FIG. 4B.

In some embodiments, the CDR 422 (FIG. 4A) is disabled in an energy saving state (e.g., U1, U2, and U3), and enabled in the active state (U0) when the energy saving state is terminated. The LFPS module 604 is configured to delay termination of the energy saving state and prolongs the energy saving state until the CDR 422 locks. Before the CDR 422 locks, the command signal 610 is selected to be outputted. The data signal 614 is selected in accordance with a determination that the CDR 422 locks. Stated another way, the data signal 514 is delayed from being outputted as the output signal 510 until a corresponding CDR loop has stabilized. By these means, the electrical idle state occurs between the energy saving state and the active state, and at the output of the retimer 320, a temporal length of the electrical idle state is controlled (e.g., below 20 ns) in compliance with the specifications of the high-speed serial computer expansion bus standard (e.g., USB 3.0 or above).

In some embodiments, the LFPS module 604 includes a low-pass filter 618, an LFPS pattern recognition module 620, and an LFPS regenerator 622. Further, in some embodiments, the low-pass filter 618 is configured to output an envelope signal 624 that includes an envelope of the exit command in the input signal 502. The envelope signal 624 includes a high voltage level ("1") indicating a burst width of the exit command and a low voltage level ("0") corresponding to the electrical idle state. In some situations, a protocol agnostic repeater (e.g., including the retimer 320) is independent of any data protocol, and LFPS snooping is applied in LFPS manipulation. In some embodiments, in each energy saving state, a ping signal sequence (e.g., 702 in FIG. 7A) is issued periodically to indicate that the retimer 320 operates in the respective energy saving state. The envelope signal 624 generated by the low-pass filter 618 includes envelopes (i.e., bursts) of the ping signal sequence that appears periodically in the input signal 502. The burst width of the ping signal sequence depends on a type of the corresponding energy saving state. For example, a burst width of the second energy saving state (U2) is greater than that of the first energy saving state (U1) and shorter than that of the third energy saving state (U3). In another example, a burst width of the second energy saving state (U2) is shorter than that of the first energy saving state (U1) and greater than that of the third energy saving state (U3). Alternatively, in some embodiments, in only the first energy saving state (U1), a ping signal sequence (e.g., 702 in FIG. 7A) is issued periodically to indicate that the retimer 320 operates in the respective energy saving state. The ping signal sequence is not issued in the second or third energy saving state (U2 or U3).

Additionally, in some embodiments, a burst width corresponding to the exit command is distinct from any of the burst widths of the energy saving states (e.g., U1, U2, and U3). For example, the burst width corresponding to the exit command is greater than all of the burst widths of the ping signal sequences in the hierarchy of energy saving states of the retimer 320. As such, in some embodiments, the LFPS pattern recognition module 620 identifies each of the exit command and ping signal sequences of the energy saving states based on their associated burst width. For example, the low-pass filter 618 generates the envelope signal 624 including a plurality of bursts corresponding to a set of periodic ping signal sequences and an exit command. The LFPS pattern recognition module 620 determines burst widths of the plurality of bursts on the envelope signal 624. Based on the burst widths, the LFPS pattern recognition module 620 identifies the exit command and associates the set of periodic ping signal sequences with one of the energy saving states (e.g., U1).

In some embodiments, the LFPS regenerator 622 is controlled by the low-pass filter 618, the LFPS pattern recognition module 620, and the retimer core 606 jointly. The retimer core 606 determines whether the retimer 320 has been equalized and locked. The LFPS regenerator 622 extends the exit command in the control signal 610 in response to detection of the exit command by the LFPS pattern recognition module 620, e.g., based on a burst width of the exit command. The LFPS regenerator 622 continues to extend the exit command at least until a lock signal 626 received from the retimer 320 is enabled, indicating that the retimer 320 has been equalized and locked. In some embodiments, the lock signal 626 is applied to control the multiplexer 608. When the lock signal 626 is enabled due to equalization of the retimer 320, the data signal 614 is selected by the multiplexer 608, independently of whether the exit command continues to be extended on the control signal 610 or not.

Figure 7A:
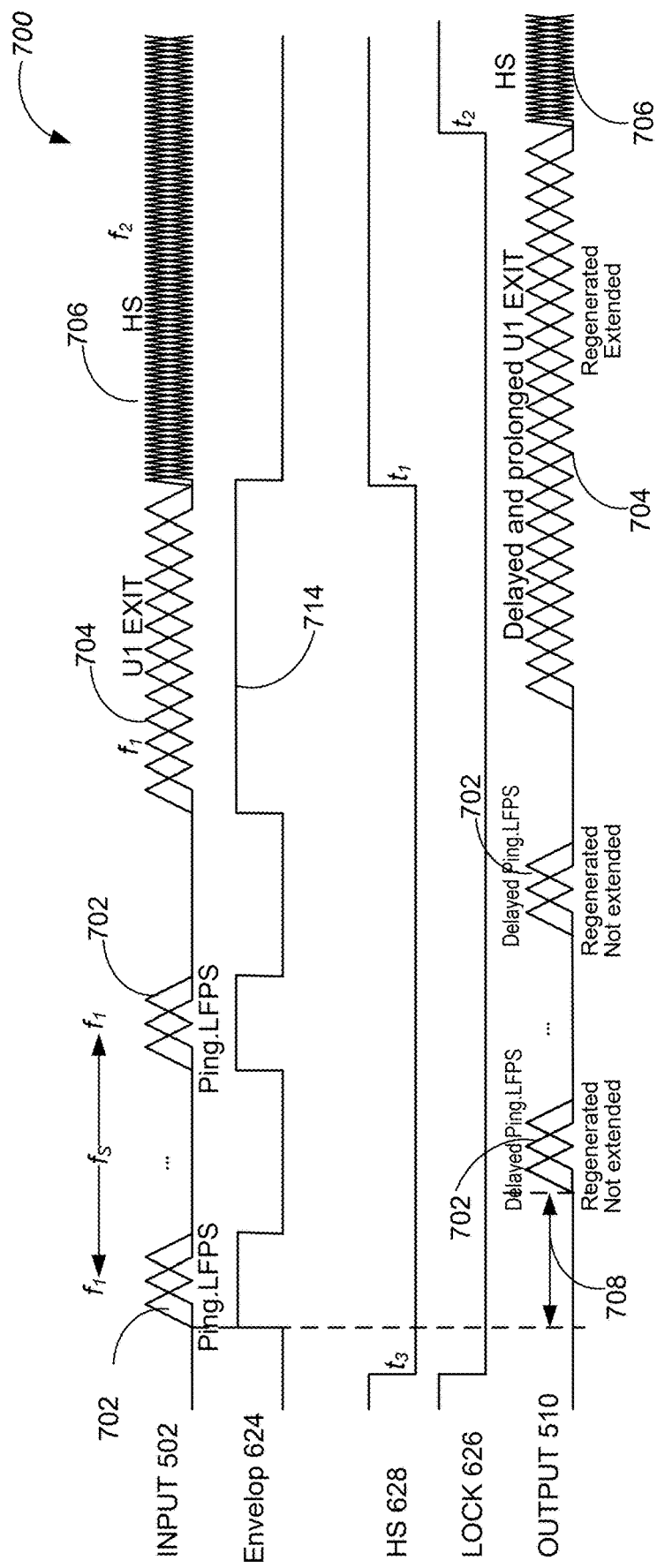
FIGS. 7A and 7B illustrate example temporal diagrams of a set of signals of a retimer in a data link under two different conditions, in accordance with some embodiments.
Figure 7B:
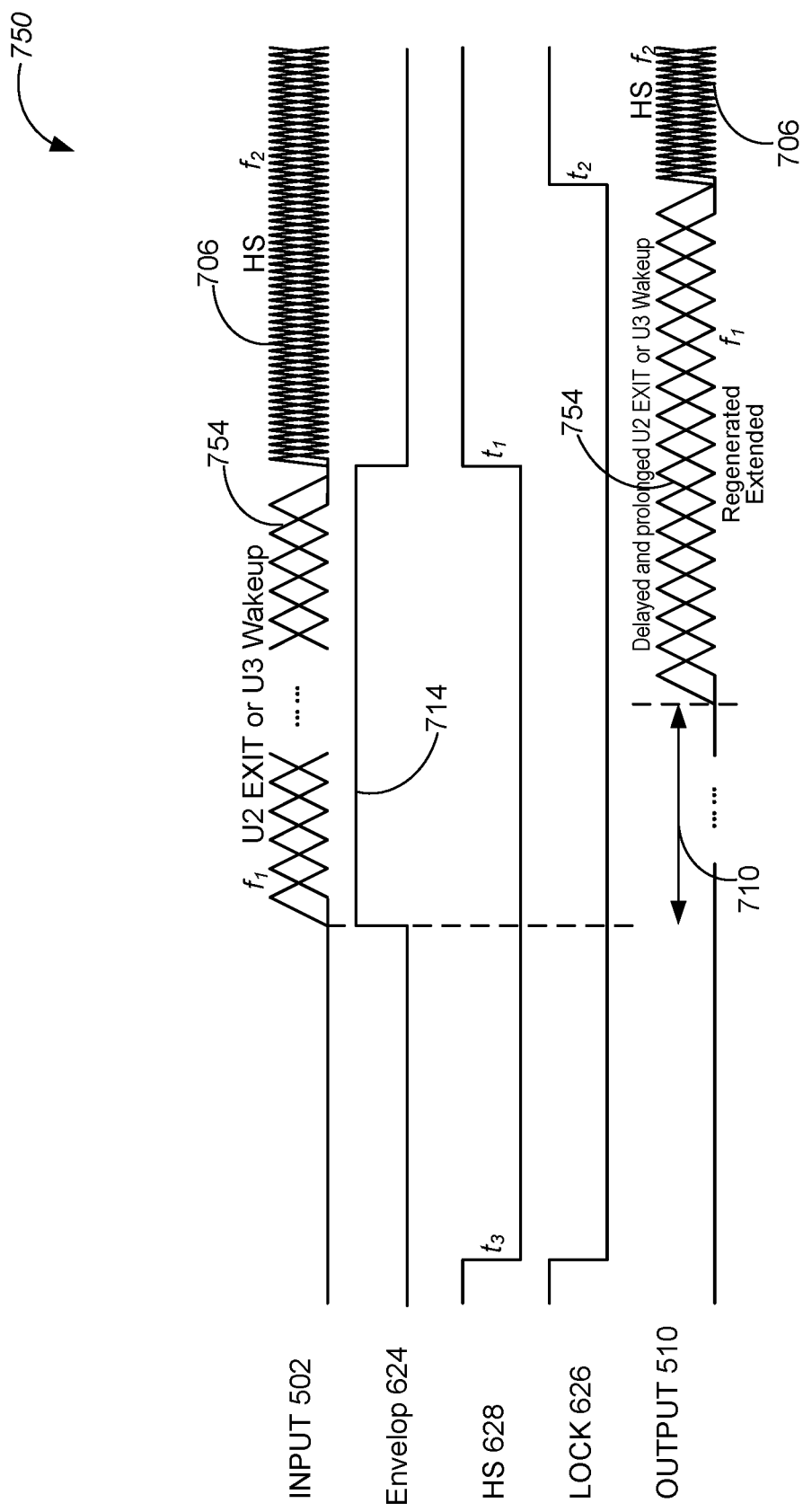

FIGS. 7A and 7B illustrate example temporal diagrams 700 and 750 of a set of signals of a retimer 320 in a data link 106 under two different conditions, in accordance with some embodiments. Referring to FIG. 7A, in some embodiments, a first energy saving state (U1), a ping signal sequence 702 (e.g., Ping.LFPS) is issued periodically to indicate that the retimer 320 operates in the first energy saving state (U1). Each ping signal sequence 702 includes a plurality of serial data bits coded according to a first frequency $f_1$ (e.g., 50 MHz), and is issued according to a sequence frequency $f_S$ (e.g., 2 MHz) lower than the first frequency $f_1$. An envelope signal 624 (FIG. 6) is generated by a low-pass filter 618, and includes envelopes (i.e., bursts) of the ping signal sequence 702 that appears periodically in the input signal 502. The first energy saving state (U1) corresponds to a first burst width of each ping signal sequence 702. The ping signal sequence 702 that is periodically issued is followed by a U1 exit command 704, indicating the first energy saving state (U1) is terminated. The U1 exit command 704 is further followed by a data sequence 706. The data sequence 706 has a second frequency $f_2$ that is higher than the first frequency $f_1$, and is transmitted in an active state (U0) of the data link 106. Stated another way, the exit command 704 terminates the first energy saving state (U1), and the data sequence 706 corresponds to an initiation of the active state (U0).

In some embodiments, the data sequence 706 immediately follows the exit command 704 on the input signal 502. Alternatively, in some embodiments, the data sequence 706 follows the exit command 704 on the input signal 502, and is separated from the exit command 704 by an electrical idle state. In some embodiments, the data sequence 706 immediately follows the exit command 704 at an output of the retimer 320. Alternatively, in some embodiments, the data sequence 706 is separated from the exit command 704 by an electrical idle state. A bus specification requires that the electrical idle state lasts less than a predefined electrical idle duration (e.g., 20 ns) at the output of the retimer 320, such that a downstream device receives and processes the data sequence 706 after the exit command 704 without misinterpreting the electrical idle state or the data sequence 706.

Referring to FIG. 7B, in some embodiments, a second energy saving state (U2) or a third energy saving state (U3) corresponds to a respective exit command 754, indicating the second or energy saving state is terminated. The exit command 754 includes a plurality of serial data bits coded according to a first frequency $f_1$ (e.g., 50 MHz). An envelope signal 624 (FIG. 6) is generated by a low-pass filter 618, and includes an envelope (i.e., a burst) corresponding to the respective exit command 754. The exit command 754 of the second energy saving state (U2) corresponds to a second burst width, and the exit command 754 of the third energy saving state (U3) corresponds to a third burst width that is optionally distinct from the second burst width. The respective exit command 754 is followed by a data sequence 706. The data sequence 706 has a second frequency $f_2$ that is higher than the first frequency $f_1$, and is transmitted in an active state (U0) of the data link 106. Stated another way, the exit command 754 terminates the corresponding energy saving state (U2 or U3), and the data sequence 706 corresponds to an initiation of the active state (U0).

In some embodiments not shown, in some embodiments, one or more ping signal sequences precedes the exit command 754 and correspond to a burst width that optionally indicates whether the retimer 320 operates at a second energy saving state (U2) or a third energy saving state (U3).

In some embodiments, the data sequence 706 immediately follows the exit command 754 on the input signal 502. Alternatively, in some embodiments, the data sequence 706 follows the exit command 704 on the input signal 502, and is separated from the exit command 704 by an electrical idle state. In some embodiments, the data sequence 706 immediately follows the exit command 704 at an output of the retimer 320. Alternatively, in some embodiments, the data sequence 706 is separated from the exit command 704 by an electrical idle state at the output of the retimer 320. A bus specification requires that the electrical idle state lasts less than a predefined electrical idle duration (e.g., 20 ns) at the output of the retimer 320, such that a downstream device receives and processes the data sequence 706 after the exit command 754 without misinterpreting the electrical idle state or the data sequence 706.

Referring to FIGS. 7A and 7B, in some embodiments, a high speed detector 616 (FIG. 6) detects a start of the data sequence 706 in the input signal 502, and enables a high speed data signal 628, indicating the start of the data sequence 706 in the input signal 502. In accordance with a determination that the high speed data signal 628 is enabled, e.g., at a first time $t_1$, the retimer 320 (e.g., the retimer core 606) starts to be equalized by an equalization procedure until the retimer 320 is stabilized and locked at a second time $t_2$ subsequent to the first time $t_1$. Stated another way, the retimer 320 detects a start of the data sequence 706 in the input signal 502 via the high speed detector 616, and is equalized in response to detection of the start of the data sequence 706 in the input signal 502. The lock signal 626 is enabled at the second time $t_2$. The input signal 502 is split into two distinct signals including a control signal 610 carrying the exit command 704 or 754 and a data signal 614 carrying the data sequence 706. The exit command 704 or 754 carried by the control signal 610 is extended and selected to be outputted at the output of the retimer 320, until the lock signal is enabled at the second time $t_2$ in accordance with a determination that the retimer 3200 has been equalized and locked. Additionally, in accordance with a determination that the retimer 320 has been equalized and locked, the data signal 614 is outputted to provide the data sequence 706 at the output of the retimer 320.

In some embodiments not shown, one or more polling signal sequences (e.g., 814 in FIG. 8) are applied on the input signal 502 to check a status of an electronic device 102 or 104 coupled to the data link 106 at regular intervals to determine if the electronic device is ready for communication or has data to transmit. In the context of USB, the electronic device 102 or 104 is polled to check if they are connected, powered, and ready for data transfer. In some embodiments, each polling signal sequence correspond to a polling burst width that is substantially equal to a polling delay $T_{PO}$. In some embodiments, the ping signal sequences 702 are periodically issued on the input signal 502 on the first power saving state (U0). In some situations, the first power saving state (U0) automatically switches to the second power saving state (U2) or second power saving state (U3) in accordance with a determination that a predefined duration of time has passed. The polling signal sequence is optionally issued on the input signal 502 periodically in the power saving state (U2 or U3)

In some embodiments, each of the ping signal sequence 702, the exit commands 704 and 754, and the data sequence 706 is outputted at the output of the retimer 320 with a respective delay time (e.g., a ping delay 708 ($T_{PI}$) of the ping signal sequence 702). In an example, an exit command 754 for terminating the second power saving state (U2) or the third power saving state (U3) has a polling delay 710 ($T_{PO}$) measured between starts of the exit command 754 on the output signal 510 and the input signal 502 of the retimer 320. In some situations, the polling delay 710 ($T_{PO}$) is greater than the polling burst width of the polling data sequence (e.g., 814 in FIG. 8).

Figure 8:
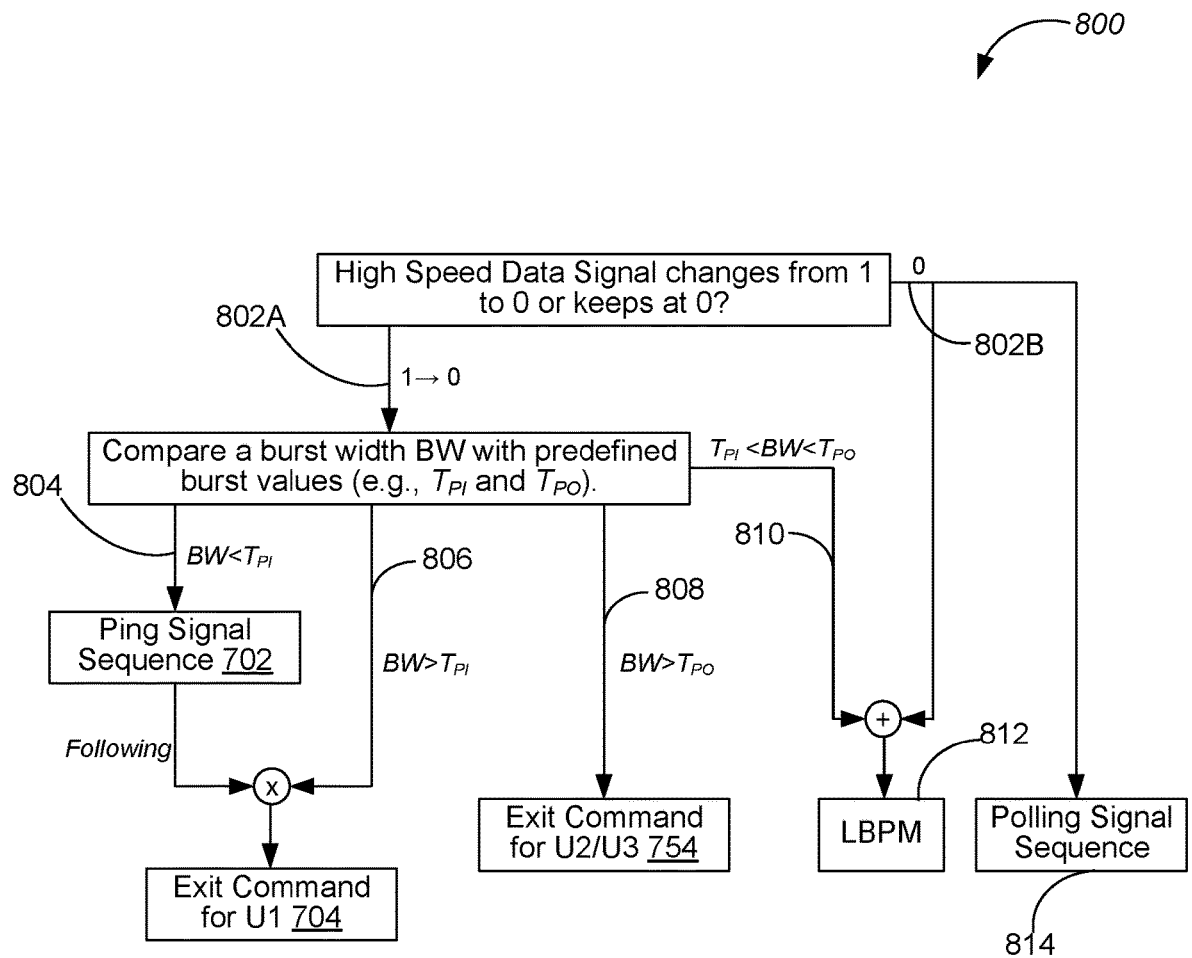
FIG. 8 is a flow diagram of a process of identifying different types of data sequences coded based on LFPS, in accordance with some embodiments.

FIG. 8 is a flow diagram of a process 800 of identifying different types of data sequences coded based on LFPS, in accordance with some embodiments. In some embodiments, the high speed detector 616 detects that a termination of a data sequence 706, and the high speed data signal 628 is disabled (802A), e.g., at a third time $t_3$. The low-pass filter 618 generates an envelope signal 624 including an envelope of the ping signal sequence 702 or the exit command 704 or 754, and the LFPS pattern recognition module 620 determines a burst width BW of the envelope and identifies the ping signal sequence 702 or the exit command 704 or 754 based on the burst width of the envelop. In some embodiments, in accordance with a determination the burst width of the envelope is less than (804) the ping delay 708 ($T_{PI}$) while high speed data signal 628 is disabled, the LFPS pattern recognition module 620 determines that the envelope is associated with a ping signal sequence 702. Further, in some embodiments, in accordance with a determination a burst width of a distinct envelope following the identified ping signal sequence 702 is greater than (806) the ping delay 708 ($T_{PI}$), the LFPS pattern recognition module 620 identifies the exit command 704 for terminating the first energy saving state (U1). In some embodiments, the polling delay 710 ($T_{PO}$) of the exit command 754 is greater than the ping delay 708 ($T_{PI}$) of the ping signal sequence 702. In accordance with a determination that the burst width of an envelope is greater than (808) the polling delay 710 ($T_{PO}$), the LFPS pattern recognition module 620 determines that the envelope corresponds to an exit command 754 for terminating the second energy saving state (U2) or the third energy saving state (U3).

Additionally, in some embodiments, in accordance with a determination that a burst width of an envelope of the envelope signal 624 is (810) between the ping delay 708 ($T_{PI}$) and the polling delay 710 ($T_{PO}$), the LFPS pattern recognition module 620 determines that the envelope corresponds to an LFPS-based pulse width modulation message (LBPM) 812, which allows the electronic devices 102 and 104 (FIG. 2) to communicate with each other and negotiate speed before the data link 106 is trained. In some embodiments, in accordance with a determination that a burst width of an envelope of the envelope signal 624 is less than the ping delay 708 ($T_{PI}$), the LFPS pattern recognition module 620 controls the LFPS regenerator 622 to re-generate the ping signal sequence 702 to be selected and outputted via the output signal 510, without extending or prolonging the ping signal sequence 702. The LFPS pattern recognition module 620 controls the LFPS regenerator 622 to keep an electrical idle state (i.e., output a low voltage level) corresponding to a duration of time external to the envelope of the envelope signal 624.

In some embodiments, there is no data sequence 706 on the input signal 502 (e.g., the high speed data signal 628 is disabled) for an extended duration of time (802B). A first signal sequence of the input signal 502 has a burst width between a predefined ping value $T_{PI}$ and a predefined polling value $T_{PO}$. The retimer 320 determines that the signal sequence corresponds to one of an LFPS-based pulse width modulation message (LBPM) 812 and a polling signal sequence 814, and aborts extending the first signal sequence in the control signal 610.

It is noted that in some embodiments, the LFPS pattern recognition module 620 controls whether the exit command 704 or 754 is extended jointly with the high speed detector 616. When the high speed detector 616 outputs a high speed data signal 628 at a low level (e.g., indicating there is no data sequence 706 is communicated via the retimer 320), the LFPS pattern recognition module 620 is applied to control extension of the exit command 704 or 754. Further, in response to detection of a ping signal sequence 702, a polling signal sequence 814, or an LBPM 812, the corresponding sequence or message having the first frequency $f_1$ pass through the LFPS regenerator 622 without being prolonged or extended. Conversely, in response to detection of an exit command 704 corresponding to the first energy saving state (U1) and an exit command 754 corresponding to the second or third energy saving state (U2 or U3), the corresponding exit command 704 or 754, which is coded using the first frequency $f_1$, is extended (e.g., from $t_1$ to $t_2$) until the retimer 3200 has been equalized and locked (e.g., when the lock signal 626 is enabled). In some situations, the exit command 704 or 754 is extended beyond a falling edge of a corresponding envelope of the envelope signal 624 corresponding to the exit command 704 or 754.

In some embodiments, the LFPS pattern recognition module 620 recognizes each of the ping signal sequence 702, the polling signal sequence 814, the LBPM 812, the exit command 704, and the exit command 754 based on their associated burst widths. For example, each burst width is compared with the ping delay 708 ($T_{PI}$) and the polling delay 710 ($T_{PO}$) to determine the corresponding sequence, message, or command. A burst width of the ping signal sequence 702 is less than the ping delay 708 ($T_{PI}$). A burst width of the exit command 704 corresponding to the first energy saving state (U1) is greater than the ping delay 708 ($T_{PI}$), while the exit command 704 follows the ping signal sequence 702. A burst width of the exit command 754 corresponding to the second energy saving state (U2) or the third energy saving state (U3) is greater than the polling delay 710 ($T_{PO}$). A burst width of the LBPW and a burst width of the polling signal sequence 814 is between the ping delay 708 ($T_{PI}$) and the polling delay 710 ($T_{PO}$).

FIG. 9 is a flow diagram of an example method for controlling an electrical idle state of a retimer 320 of a data link 106, in accordance with some embodiments. For convenience, the method 900 is described as being implemented by an electronic device associated with the retimer 320 of the data interface 106. A receiving side of the retimer 320 obtains (902) an input signal 502 including at least an exit command 704 (FIG. 7A) or 754 (FIG. 7B) and a data sequence 706 following the exit command. The exit command requests (904) the retimer to exit a target energy saving state and transmit the data sequence 706. The retimer 320 splits (906) the input signal 502 into two distinct signals. The two distinct signals includes (908) a control signal 610 carrying the exit command 704 or 754 and a data signal 614 carrying the data sequence 706. The retimer 320 extends (910) the exit command carried by the control signal 610, outputs (912) the control signal 610 carrying the extended exit command at an output of the retimer 320, and in accordance with a determination that the retimer 320 has been equalized and locked, outputs (914) the data signal 614 carrying the data sequence 706 at the output of the retimer 320.

In some embodiments, the retimer 320 is equalized to compensate for distortion of the input signal 502 and re-generate the data signal 614 including the data sequence 706. Further, in some embodiments, the retimer 320 detects a start of the data sequence 706 in the input signal 502 (e.g., corresponding to a time $t_1$ in FIGS. 7A and 7B). The retimer 320 is equalized in response to detection of the start of the data sequence 706 in the input signal 502.

In some embodiments, in accordance with a determination that the retimer 320 has been equalized and locked (e.g., at a time $t_2$ in FIGS. 7A and 7B), the retimer 320 terminates outputting of the extended exit command in the control signal 610. The data sequence 706 is selected and outputted to the output of the retimer 320 within a predefined electrical idle duration (e.g., 20 ns) after the extended exit command is terminated.

In some embodiments, the exit command includes a digital signal having a first frequency $f_1$, and the data sequence 706 includes a plurality of data bits temporally encoded according to a clock signal having a second frequency $f_2$ that is greater than the first frequency $f_1$. In an example, the first frequency is 10-50 MHZ, and the second frequency is 8 Gbps.

In some embodiments, the retimer 320 separates the input signal 502 into the control signal 610 and the data signal 614 by extracting an envelope 714 of the exit command. The retimer 320 determines a burst width of the envelope 714 of the exit command and identifies the exit command based on the burst width of the envelop 714 of the exit command. For example, referring to FIG. 7B, the retimer 320 identifies the exit command 754 in accordance with a determination that the burst width of the envelop 714 is greater than the polling delay $T_{PO}$.

In some embodiments, the exit command is extended in the control signal 610 in accordance with a determination that the exit command satisfies an exit condition requiring that the exit command is (i) followed (e.g., immediately) by the data sequence 706 within a predefined short duration and (ii) has a burst width that is greater than a predefined burst value (e.g., a ping delay $T_{PI}$, a polling delay $T_{PO}$).

In some embodiments, the exit command is extended in the control signal 610, in accordance with a determination that the exit command satisfies an exit condition requiring that (i) at least one ping signal sequence 702 occurs prior to the exit command within an extended duration of time and (ii) the exit command has a burst width that is greater than a predefined burst value (e.g., a ping delay $T_{PI}$). For example, a type of the target energy saving state of the retimer is determined, e.g., based on a burst width of the ping signal sequence 702. In some situations, the exit command 704 (FIG. 7A) is separated from the most recent ping data sequence 702 by a short duration of time that is less than a predefined short duration.

In some embodiments, the retimer 320 has a plurality of energy saving states, each of which corresponds to a respective one of a plurality of burst width ranges associated with a burst width of the exit command. A first burst width range includes a burst width greater than a predefined ping value (e.g., a ping delay $T_{PI}$), and corresponds to exiting of a first energy saving state (U1). A second burst width range includes a burst width above a predefined polling value (e.g., a polling delay $T_{PO}$), and corresponds to exiting of a second energy saving state (U2) or wakeup of a third energy saving state (U3). The exit condition requires at least that the exit command corresponds to exiting the first energy saving state (U1), the second energy saving state (U2), or the third energy saving state (U3).

In some embodiments, the retimer 320 determines a burst width of the exit command. In accordance with a determination that the burst width of the exit command falls within a target burst width range corresponding to exiting of the target energy saving state, the retimer 320 determines that the retimer 320 is requested by the exit command to exit the target energy saving state. In an example, a first burst width range corresponds to exiting of a first energy saving state (U1), and includes a burst width above the predefined ping value. Further, in some embodiments, the retimer 320 recognizes, in the control signal 610, a state indicating message (e.g., a ping signal sequence 702 in FIG. 2) based on a burst width of the state indicating message. The state indicating message indicates the retimer 320 operates in the target energy saving state (e.g., in U1). In accordance with a determination that the exit command follows the state indicating message, it is determined that the retimer 320 is requested by the exit command to exit the target energy saving state. Additionally, in some embodiments, a first ping range corresponds to the state indicating message of the first energy saving state (U1), and includes a burst width less than a predefined ping value (e.g., the ping delay $T_{PI}$).

In some embodiments, the retimer 320 has a plurality of energy saving states, each of which corresponds to a respective one of a plurality of burst width ranges. In accordance with a determination that a burst width of the exit command falls within a target burst width range of the plurality of burst width ranges, the retimer 320 determines that the retimer 320 is requested by the exit command to exit the target energy saving state, among the plurality of energy saving states. The target energy saving state corresponds to the target burst width range. Further, in some embodiments, the first burst width range corresponds to exiting of a first energy saving state (U1), and includes a burst width greater than a predefined ping value (e.g., a ping delay $T_{PI}$). A second burst width range includes a burst width above a predefined polling value (e.g., a polling delay $T_{PO}$), and corresponds to exiting of a second energy saving state (U2) or wakeup of a third energy saving state (U3).

In some embodiments, there is no data sequence 706 on the input signal 502 (e.g., because the high speed data signal 628 is disabled) for an extended duration of time. A random signal sequence of the input signal 502 has a burst width between a predefined ping delay $T_{PI}$ and a predefined polling delay $T_{PO}$. The retimer 320 determines that the signal sequence corresponds to one of an LFPS-based pulse width modulation message (LBPM) 912 and a polling signal sequence 914, and aborts extending the random signal sequence in the control signal 610.

In some embodiments, the retimer 320 is applied in a data communication channel that is configured to transfer data in compliance with a Universal Serial Bus (USB) standard.

In some embodiments, the input signal 502 is provided by a transmission side of the retimer 320, which is coupled to a processor of an electronic device and configured to receive at least part of the data sequence 706 of the input signal 502 from the processor. The output of the retimer 320 is coupled to an external load device of the electronic device and configured to transmit at least part of the data sequence 706 of the input signal 502 to the external load device.

It should be understood that the particular order in which the operations in FIG. 9 has been described is merely exemplary and are not intended to indicate that the described order is the only order in which the operations could be performed. One of ordinary skill in the art would recognize various ways to control clock data recovery for a data communication channel. Additionally, it should be noted that details of other processes and structures described above with respect to FIGS. 1-7B are also applicable in an analogous manner to method 900 described above with respect to FIG. 9. For brevity, these details are not repeated here.

In some embodiments, the method 900 is governed by instructions that are stored on a non-transitory computer readable storage medium and that are executed by one or more processors of the electronic device. Each of the operations shown in FIG. 9 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 900 may be combined and/or the order of some operations may be changed.

It will also be understood that, although the terms first and second are used, in some instances, to describe various elements, these elements are not limited by these terms. These terms are only used to distinguish one element from another. For example, a first electronic device can be termed a second electronic device, and, similarly, a second electronic device can be termed a first electronic device, without departing from the scope of the various described embodiments. The first electronic device and the second electronic device are both electronic devices, but they are not the same electronic device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The above description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for controlling an electrical idle state of a retimer, comprising:
   obtaining, by a receiving side of the retimer, an input signal including at least an exit command and a data sequence following the exit command, the exit command requesting the retimer to exit a target energy saving state and transmit the data sequence;
   splitting the input signal into two distinct signals, the two distinct signals including a control signal carrying the exit command and a data signal carrying the data sequence;
   while training a core of the retimer and until the retimer is locked:
   extending the exit command carried by the control signal; and
   outputting the control signal carrying the extended exit command at an output of the retimer; and
   in accordance with a determination that the retimer has been equalized and locked, outputting the data signal carrying the data sequence at the output of the retimer.

2. The method of claim 1, further comprising:
   equalizing the retimer to compensate for distortion of the input signal and re-generate the data signal including the data sequence.

3. The method of claim 2, further comprising:
   detecting a start of the data sequence in the input signal, wherein the retimer is equalized in response to detection of the start of the data sequence in the input signal.

4. The method of claim 1, further comprising:
   in accordance with a determination that the retimer has been equalized and locked, terminating the extended exit command in the control signal;
   wherein the data sequence is outputted to the output of the retimer within a predefined electrical idle duration after the extended exit command is terminated.

5. The method of claim 1, wherein the exit command includes a digital signal having a first frequency, and the data sequence includes a plurality of data bits temporally encoded according to a clock signal having a second frequency that is greater than the first frequency.

6. The method of claim 1, wherein separating the input signal into the control signal and the data signal further includes extracting an envelope of the exit command, the method further comprising:
   determining a burst width of the envelope of the exit command; and
   identifying the exit command based on the burst width of the envelope of the exit command.

7. The method of claim 1, wherein:
   the exit command is extended in the control signal in accordance with a determination that the exit command satisfies an exit condition requiring that the exit command is (i) followed by the data sequence within a predefined short duration and (ii) has a burst width that is greater than a predefined burst value.

8. The method of claim 1, wherein:
the retimer has a plurality of energy saving states, each of which corresponds to a respective one of a plurality of burst width ranges associated with a burst width of the exit command;
a first burst width range includes a burst width greater than the ping value, and corresponds to exiting of a first energy saving state (U1);
a second burst width range includes a burst width greater than a polling value, and corresponds to exiting of a second energy saving state (U2) or wakeup of a third energy saving state (U3); and
the exit condition requires at least that the exit command corresponds to exiting the first energy saving state (U1), the second energy saving state (U2), or the third energy saving state (U3).

9. The method of claim 1, further comprising:
determining a burst width of the exit command;
in accordance with a determination that the burst width of the exit command falls within a target burst width range corresponding to exiting of the target energy saving state, determining that the retimer is requested by the exit command to exit the target energy saving state.

10. The method of claim 9, further comprising:
recognizing, in the control signal, a state indicating message based on a burst width of the state indicating message, the state indicating message indicating the retimer operates in the target energy saving state; and
wherein, in accordance with a determination that the exit command follows the state indicating message, it is determined that the retimer is requested by the exit command to exit the target energy saving state;
wherein a first ping range corresponds to the state indicating message of a first energy saving state (U1), and includes any burst width less than a ping value.

11. The method of claim 1, wherein the retimer has a plurality of energy saving states, each of which corresponds to a respective one of a plurality of burst width ranges, the method further comprising:
in accordance with a determination that a burst width of the exit command falls within a target burst width range of the plurality of burst width ranges, determining that the retimer is requested by the exit command to exit the target energy saving state, among the plurality of energy saving states, the target energy saving state corresponding to the target burst width range.

12. The method of claim 11, wherein:
the first burst width range corresponds to exiting of a first energy saving state (U1), and includes a burst width greater than the ping value; and
a second burst width range includes a burst width above a polling value, and corresponds to exiting of a second energy saving state (U2) or wakeup of a third energy saving state (U3).

13. The method of claim 1, the method further comprising:
in accordance with a determination that there is no data sequence on the input signal for an extended duration of time and the exit command of the input signal has a burst width greater than a predefined ping value that defines exiting of the target energy saving state, determining that the retimer is requested by the exit command to operate at one of an LFPS-based pulse width (LBPW) state and a polling state, and aborting extending the exit command in the control signal.

14. A retimer device, comprising:
an input interface for obtaining, by a receiving side of the retimer device, an input signal including at least an exit command and a data sequence following the exit command, the exit command requesting the retimer device to exit a target energy saving state to transmit the data sequence in a normal state;
a low frequency periodic signaling (LFPS) module coupled to the input interface, the LFPS module configured to extract, from the input signal, a control signal carrying the exit command and extend the exit command in the control signal;
a retimer core coupled to the input interface, the retimer core configured to re-generate a data signal carrying the data sequence from the input signal; and
a multiplexer coupled to the LFPS module and the retimer core, wherein the multiplexer is configured to:
select the control signal and output the control signal carrying the extended exit command at an output of the retimer device; and
in accordance with a determination that the retimer device has been equalized and locked, select the data signal and output the data signal carrying the data sequence at the output of the retimer device;
wherein while the retimer core is being trained and until the retimer core is locked, retimer device extends the exit command carried by the control signal and outputs the control signal carrying the extended exit command.

15. The retimer device of claim 14, further comprising:
a high speed detector coupled to the retimer core and configured to detect a start of the data sequence in the input signal.

16. The retimer device of claim 14, wherein:
the exit command is extended in the control signal, in accordance with a determination that the exit command satisfies an exit condition requiring that (i) at least one ping signal sequence occurs prior to the exit command within an extended duration of time and (ii) the exit command has a burst width that is greater than a predefined ping value.

17. A non-transitory computer-readable storage medium stores one or more programs to be executed by one or more processors, the one or more programs include instructions for:
obtaining, by a receiving side of a retimer, an input signal including at least an exit command and a data sequence following the exit command, the exit command requesting the retimer to exit a target energy saving state and transmit the data sequence;
splitting the input signal into two distinct signals, the two distinct signals including a control signal carrying the exit command and a data signal carrying the data signal;
while training a core of the retimer and until the retimer is locked:
extending the exit command carried by the control signal; and
outputting the control signal carrying the extended exit command at an output of the retimer; and
in accordance with a determination that the retimer has been equalized and locked, outputting the data signal carrying the data sequence at the output of the retimer.

18. The non-transitory computer-readable storage medium of claim 17, wherein the retimer is applied in a data communication channel that is configured to transfer data in compliance with a Universal Serial Bus (USB) standard.

19. The non-transitory computer-readable storage medium of claim 17, wherein:
- the input signal is provided by a transmission side of the retimer, which is coupled to a processor of an electronic device and configured to receive at least part of the data sequence of the input signal from the processor; and
- the output of the retimer is coupled to an external load device of the electronic device and configured to transmit at least part of the data sequence of the input signal to the external load device.

20. The method of claim 1, wherein the exit command is extended by a signaling module, outputting the control signal further comprising:
- bypassing the core with the signaling module to output the control signal.

* * * * *